US006211408B1

(12) United States Patent
Hilton

(10) Patent No.: US 6,211,408 B1
(45) Date of Patent: Apr. 3, 2001

(54) METHOD OF REMOVING IODIDES FROM NON-AQUEOUS ORGANIC MEDIA UTILIZING SILVER OR MERCURY EXCHANGED MACROPOROUS ORGANOFUNCTIONAL POLYSILOXANE RESINS

(75) Inventor: Charles B. Hilton, Corpus Christi, TX (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 09/275,717

(22) Filed: Mar. 24, 1999

(51) Int. Cl.$^7$ .................................................. C07C 51/47
(52) U.S. Cl. ................ 562/608; 528/30; 556/9; 525/475; 210/679; 210/683
(58) Field of Search ............................ 528/30; 525/475; 556/9; 210/679, 683; 562/608

(56) References Cited

U.S. PATENT DOCUMENTS

| | | | |
|---|---|---|---|
| 3,328,449 | * 6/1967 | Haluska | 260/448.2 |
| 4,552,700 | * 11/1985 | Panster et al. | 556/9 |
| 4,615,806 | * 10/1986 | Hilton | 210/690 |
| 4,652,280 | * 3/1987 | Boeren et al. | 55/57 |
| 5,105,026 | 4/1992 | Powell et al. | 568/727 |
| 5,220,058 | * 6/1993 | Fish et al. | 562/608 |
| 5,315,042 | 5/1994 | Cipullo et al. | 568/727 |
| 5,464,559 | 11/1995 | Marchin et al. | 252/181 |
| 5,504,234 | 4/1996 | Omura et al. | 556/439 |

FOREIGN PATENT DOCUMENTS 2112394A    12/1992   (GB) .

OTHER PUBLICATIONS

Stefan Wieland and Peter Panster, "Replacing LiquidAcids in Fine Chemicals by Sulfonated Polysiloxanes as Solid Acids and as Supports for Precious Metal Catalysts" Degussa Technical Data Sheets, 15 sheets.

* cited by examiner

Primary Examiner—Margaret G. Moore
(74) Attorney, Agent, or Firm—James J Mullen; Michael W. Ferrell

(57) ABSTRACT

Macroporous, strong-acid polysiloxane ion exchange resins which have been converted to the silver or mercury form are utilized to remove iodides from non-aqueous organic media. In a particularly preferred method, hexyl iodide is removed from acetic acid.

9 Claims, No Drawings

METHOD OF REMOVING IODIDES FROM NON-AQUEOUS ORGANIC MEDIA UTILIZING SILVER OR MERCURY EXCHANGED MACROPOROUS ORGANOFUNCTIONAL POLYSILOXANE RESINS

TECHNICAL FIELD

The present invention relates generally to macroporous organofunctional polysiloxane resins and more particularly to strong acid, silver or mercury-exchanged macroporous polysiloxane resins wherein at least one percent of its active sites have been converted to the silver or mercury form.

BACKGROUND ART

Ion exchange resins are well known in the art. Typically, such resins are used as acid catalysts to synthesize various products. There is shown, for example, in U.S. Pat. No. 5,504,234 to Omura et al. the method for the preparation of (meth) acryloxyalkyl group-containing linear organopolysiloxanes. Instead of using a conventional acidic catalyst, the reaction is promoted by the use of a cation-exchange resin in the H+ form which is readily removed from the polymerization mixture after completion of the reaction. The catalytic efficiency of the cation-exchange resin is further enhanced if the resin is swollen with a polar organic solvent such as tetrahydrofuran prior to its use in the process.

There is shown in U.S. Pat. No. 5,315,042 to Cipullo et al. a process for making bisphenol-A utilizing an ion exchange resin catalyst and an optional free mercaptan promotor. Bisphenol-A is continuously prepared by reaction of phenol and acetone in the presence of an acidic catalyst under accelerated flow conditions with increased throughput in order to increase initial reactivity. The acetone and bisphenol-A are separated from the effluent stream prior to depletion of the acetone whereby the residence time of the bisphenol-A is reduced and undesirable by-products and color are reduced.

In U.S. Pat. No. 5,105,026 to Powell et al. there is shown another process for preparing bisphenol-A. In the '026 patent the process generally includes reacting a carbonyl compound with a stoichiometric excess of a phenolic compound in the presence of an acidic catalyst, crystallizing bisphenol-A and using an acidic ion exchange resin catalyst to convert at least a portion of the by-product to bisphenol.

Ion exchange resins are also typically used to remove undesirable ionic compounds from various media. For example, cationic resins are used in their sodium or hydrogen form to remove undesirable metallic ions from drinking water. So also, such resins are used in their acid (H+) form in like applications in organic media. Anionic resins, on the other hand, can be used to remove undesirable anions from various liquid media as is shown, for example, in U.K. Patent Application No. 2,112,394, published Jul. 20, 1983 of Becker et al. This patent relates to the removal of iodide compounds from acetic acid by using anionic ion exchange resins and reports efficiencies of up to approximately 90 percent.

There is also known in the art various processes which employ silver-exchanged cationic ion exchange resins for various purposes as further discussed below.

There is shown in U.S. Pat. No. 5,464,559 to Marchin et al. a composition for treating drinking water for the purpose of disinfecting the water and/or removing iodide. A chelating resin having iminodiacetate chelating groups is employed and the resin is loaded with not over 0.5 mol of silver ions per mol of iminodiacetate.

U.S. Pat. No. 5,220,058 of Fish et al. Discloses a process for removing iodides from carboxylic acids and/or carboxylic acid anhydrides. The process described involves using an ion exchange resin in which thiol functional groups have been exchanged with silver, palladium or mercury.

In U.S. Pat. No. 4,615,806 to Hilton there is shown a preferred method for removing iodide compounds from non-aqueous media, such as acetic acid. The media is contacted with a macroreticulated (macroporous), strong-acid cation exchange resin which has at least one percent of its active sites converted to the silver or mercury form. By way of the method of the '806 patent, iodide compounds, both organic iodides and ionic iodides are quantitatively removed from acetic acid in short contact times (on the order of 100 seconds). The resins of the present invention may be used in practicing the process of U.S. Pat. No. 4,615,806 in order to remove iodide compounds from non-aqueous media such as acetic acid and acetic anhydride at elevated temperatures.

SUMMARY OF INVENTION

There is provided in accordance with the present invention a macroporous, strong-acid polysiloxane ion exchange resin wherein at least one percent of the active sites have been converted to the silver or mercury form. Although it may be possible to convert from 1 to 100 percent of the active sites of the resin to the silver or mercury form, generally speaking, at least 25% of the active sites of the resin are converted to the silver form. Typically 25 to 75% of the active sites are converted to the silver or mercury form as described hereinafter.

In general, the resins in accordance with the present invention have a pore volume of from about 1 to about 3 ml per gram. From about 1.5 to about 2 ml per gram of pore volume is typical. The macropores of the resins have a characteristic pore size of its macropores of from about 5 to about 100 nanometers (nm).

Characteristically, resins in accordance with the present invention are made up of repeat units of the formula I:

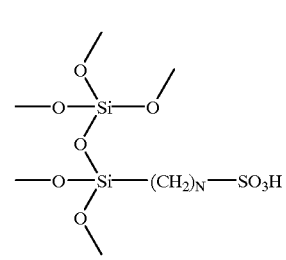

wherein n is an integer from 1 to 6. Typically the alkyl chains carrying the sulfonic acid group has three carbon atoms and thus n is commonly 3.

In another embodiment the macroporous, strong-acid polysiloxane ion exchange resins utilized in accordance with the present invention are made up of repeat units of the formula II:

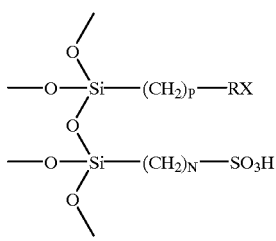

(II)

where R is a methylene radical, n is an integer from 1 to 6, p is an integer from 2 to 4 and x is optionally a hydrogen atom or the radical -SH.

In yet another aspect in the present invention there is provided a method for removing iodide compounds from a non-aqueous organic medium comprising contacting the medium containing the iodide compounds with a macroporous, strong-acid, polysiloxane ion exchange resin where at least 1 percent of the active sites have been converted to the silver or mercury form. In a typical application of the inventive process, the organic medium is acetic acid or acetic anhydride and the iodide compounds include alkyl iodides. In a particularly preferred process in accordance with the present invention, hexyl iodide is removed from acetic acid.

DETAILED DESCRIPTION

The invention is described in detail below with reference to several embodiments. Such embodiments are illustrative only and do not limit the scope of the invention which is set forth in the appended claims.

The present invention, in a first aspect, is directed to macroporous, strong-acid, polysiloxane ion exchange resins where at least one percent of the active sites have been converted to the silver or mercury form. Polysiloxane resins are well known in the art, typically made by way of a sol-gel condensation process and are available from Degussa, A. G., Frankfurt, Am Main, under the trade name Deloxan ASP. These resins (prior to and after conversion to the silver or mercury form) have the properties set forth in the following Table 1:

TABLE 1

Macroporous Strong-Acid Polysiloxane Ion Exchange Resin

| | |
|---|---|
| Trade Name: | Deloxan ASP |
| Resin Material: | Macroporous organofunctional polysiloxane |
| Functionality: | Chemically bonded sulfonic acid group |
| H+ capacity: | 0.7–1.1 meq/g (dry substance) |
| Macroscopic appearance: | Attrition resistance spheres or micro spheres |
| Particle size: | Variable, depending on application, 0.4–1.6 mm (fixed-bed) 0.1–0.4 mm (suspension) |
| Specific surface area: | 400–600 m²/g (BET) |
| Pore Volume: | 1.0–1.5 ml/g (pore size: 6–12 nm) 0.3–0.8 ml/g (pore size: >30 nm) 1.5–2.0 ml/g (total pore volume) |
| Bulk density: | 0.8–1.2 kg/l (wet form, shipping weight) 0.20–0.35 kg/l (dry substance) |
| Water content: | 60–80% (delivery form) |
| Typical True Density: | 2.0 g/ml |
| Operating Temperature Range: | Max. 230° C., depending on pH value, medium and reaction conditions. |
| Operating pH range: | 0–10 (temperature dependent) |
| Operating medium: | Aqueous and organic medium |

TABLE 1-continued

Macroporous Strong-Acid Polysiloxane Ion Exchange Resin

| | |
|---|---|
| Resistance to chemicals: | Resistant to organic solvents and strong-acids, not resistant to strong bases |
| Delivery form: | H+- form |
| General Technical Description and Applications: | Advantageous applications for the DELOXAN ® solid acid catalyst ASP are in the field of ether formation, ether cleavage, oligomerization, dehydration, esterification and transesterifications reactions. Extreme stability of the catalyst is observed in gas phase reactions and in the absence of an excess of water. Special features of the catalyst ASP are its high activity and selectivity in the above mentioned reactions. Its high structure stability (no swelling and no shrinking) and shape stability, especially in organic media, is to be stressed. Drying of the DELOXAN ® solid acid catalyst and conditions where crushing and milling of the beads takes place should be avoided. It is recommended to remove water from the wet delivery form of the catalyst by successive extraction with alcohol and finally washing with the solvent to be used, if the catalyst is to be used in organic, anhydrous media. |

The resins generally have a pore volume of from about 1 to about 3 ml per gram; while from about 1.5 to about 2 ml per gram is typical. The macropores of the resin generally have a characteristic pore size of from about 5 to about 100 nanometers as can be seen from Table 1 above.

A resin such as that described above in Table 1 is converted, to the desired degree to the silver or mercury form, by simply contacting the resin with the solution of the desired silver or mercury ion for a sufficient length of time to allow for association of the metal ions with the resin.

The amount of silver or mercury associated with the resin is not critical and may be as low as about 1% of the active sites to as high as 100% of the active sites converted to the silver or mercury form. Preferably about 25 to about 75% are converted to the silver or mercury form and perhaps most preferably about 50%. The preferred metal is silver.

As some silver may be leached from the silver treated, ion exchange resin during conditions of its use, it may be useful to have a bed of ion exchange resin which has not been previously been converted to the silver form placed downstream of the bed of silver treated ion exchange resin.

The organofunctional polysiloxanes in accordance with the present invention overcome drawbacks of organic polymers in many applications by virtue of their inert matrix material and excellent compatibility with almost all organic solvents. The sol-gel process employed for synthesis of the polysiloxane resins allows for obtaining products of consistently controllable size with a relatively narrow particle size distribution, e.g. from 100 microns to 400 microns for use in suspension or as spheres with diameters of up to 1.4 mm for fixed bed applications. Furthermore, the resins are characterized by their high porosity, large pore diameters (greater than 20 nanometers) and high BET surface areas (300–600 m²/g). The resins are extremely stable in gas phase reactions and in organic media. Special advantages of the catalyst include high structural stability, that is, no swelling and no shrinking in organic media, high temperature stability, eg. stability to greater than 200° C.

EXAMPLE 1

A 30 ml portion of Deloxan® ASP macroporous, strong-acid organofunctional polysiloxane is mixed in 100 ml water with 8 grams silver nitrate. The material is filtered and dried in a fluidized bed dryer, slurried in acetic acid and packed in a 24 mm ID column. 50 ml portion of acetic acid containing 0.2 weight percent methyl iodide is passed through the resin bed at 4–5 ml/min. (8–10 bed volumes per hour) at ambient temperatures. The methyl iodide is quantitatively removed from the acetic acid.

EXAMPLE 2

Acetic acid containing hexyl iodide is passed at a flow rate of 8.75 ml/min (10.1 bed volume/hour) through a column consisting of 52 ml of silver exchanged, strong-acid, polysiloxane ion exchange resin prepared as in Example 1. Samples are collected and analyzed throughout the run. The resin is effective for quantitatively removing hexyl iodide at a level of 400 parts per billion (ppb) or more over several hours.

EXAMPLE 3

Example 1 is repeated, except that the resin is converted to the mercury form by utilizing mercuric acetate instead of silver nitrate.

EXAMPLE 4

Example 1 is repeated in the vapor phase at 150° Centigrade.

What is claimed is:

1. A method for removing iodide compounds from a non-aqueous organic medium comprising contacting the medium containing said iodide compounds with a macroporous, strong-acid, polysiloxane ion exchange resin wherein the macropores have a pore volume of from about 1 to about 3 ml/gram and a pore size in the range of from about 5 to about 100 nanometers and where at least 1 percent of the cationic ion exchange sites of the resin have been converted to the silver or mercury form.

2. The method according to claim 1, wherein the iodide compounds comprise alkyl iodides.

3. The method according to claim 2, wherein said alkyl iodides comprise hexyl iodide.

4. The method according to claim 1, wherein said organic medium is selected from the group consisting of acetic acid, acetic anhydride and mixtures thereof.

5. The method according to claim 4, wherein said medium is acetic acid.

6. The method according to claim 5, wherein said medium is acetic acid and the iodide compounds comprise hexyl iodide.

7. The method according to claim 1, wherein said strong-acid polysiloxane ion exchange resin has at least 25% of its cationic ion exchange sites converted to the silver form.

8. The method according to claim 7, wherein from about 25% to about 75% of the cationic ion exchange sites of the strong-acid polysiloxane ion exchange resin have been converted to the silver form.

9. The method according to claim 1, wherein the macropores of the polysiloxane ion exchange resin have a pore volume of from about 1.5 to about 2 ml per gram.

* * * * *